Jan. 2, 1940.  W. A. KYSOR  2,185,855

CAR HEATER

Filed Aug. 17, 1938

INVENTOR.
Walter A. Kysor
BY Earl & Chappell
ATTORNEYS

Patented Jan. 2, 1940

2,185,855

UNITED STATES PATENT OFFICE 2,185,855

CAR HEATER

Walter A. Kysor, Cadillac, Mich.

Application August 17, 1938, Serial No. 225,255

3 Claims. (Cl. 98—2)

This invention relates to improvements in car heaters.

The main objects of my invention are:

First, to provide a novel heating arrangement for vehicles such as buses and other passenger carrying coaches.

Second, to provide a heating system of the type described which insures an effective flow of heated air throughout the interior of the coach.

Third, to provide a system of the type described which is simple in nature, compact, and arranged for the most part out of sight beneath the passenger compartment of a vehicle.

Further objects relating to details and economies of my invention will definitely appear from the description to follow. The invention is defined in the claims.

A structure embodying the features of my invention is illustrated in the accompanying drawing, wherein.

Figure 1:
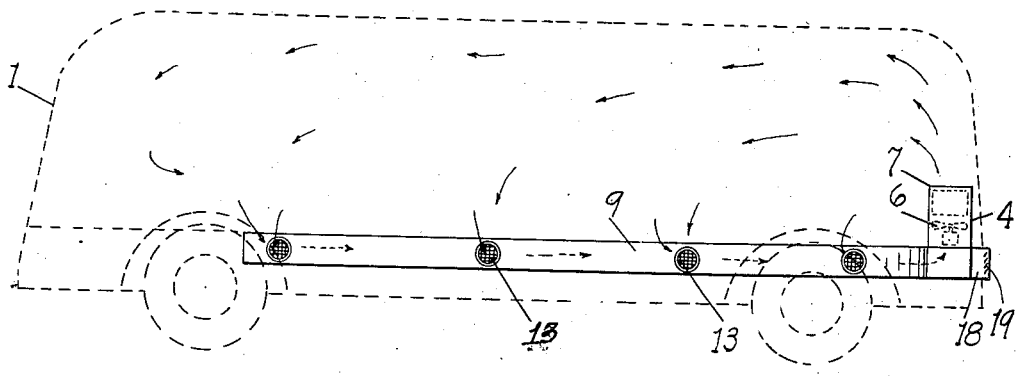
Fig. 1 is a side view illustrating in dotted lines the outline of a bus or similar passenger carrying coach, the parts of the heating system of my invention being illustrated in operative relation to the coach body.

The present invention relates to a heating system for buses having provision for uniformly circulating heated air throughout the interior of the bus to insure that all parts thereof are at a substantially constant temperature. The invention consists in the arrangement of a heater and a return air duct on the coach, with the latter element disposed beneath the floor of the coach, whereby to occupy none of the interior coach space, and communicating with a central longitudinally extending depressed aisle or passage well between the rows of seats in the coach, the system being particularly devised for this type of vehicle body.

Referring to the drawing, the reference numeral 1 in general indicates the body of a bus, coach, or similar vehicle having a floor 2 provided with a central depressed aisle or longitudinally extending passage well 3 which is disposed between rows of seats (not shown) on either side of the bus. Such a depressed aisle allows adequate head room for passengers entering and leaving the bus without objectionably increasing the over-all height of the bus body. The aisle leads to the exit and step at the front of the vehicle.

The heating unit for the bus or coach is designated by the reference numeral 4 and is disposed in the interior of the coach adjacent the front end thereof. This heating unit may be of any suitable type, but is preferably of the hot water type, wherein a heat transfer unit or core 5 is connected to and receives water from the radiator of the vehicle, there being a motor driven fan 6 for creating an upwardly traveling draft or current of air. The fan and core are enclosed in a suitable housing 7 provided with a top grille 8 and air entering the bottom of the housing is heated in passing the core 5 and rises vertically in the manner indicated by the arrows in Fig. 1.

Issuing from the heater 4, the air travels rearwardly of the coach interior as shown by the arrows, thence downwardly toward the floor 2.

My invention resides in particular means associated with the forwardly located circulating heater for returning the air from the rear and intermediate points of the interior of the coach forwardly to the heater for reheating and recirculation. To this end I provide an elongated closed duct 9 which is supported underneath the floor 2 to one side of the depressed aisle or well 3 by any suitable supporting means. This duct has short branch intake ducts 10 communicating therewith and with suitable openings 11 formed at spaced intervals along the side wall 12 of the depressed aisle 3. The openings of the intake duct to the aisle are covered with suitable screens 13 to exclude solid matter from the return duct.

Figure 2:
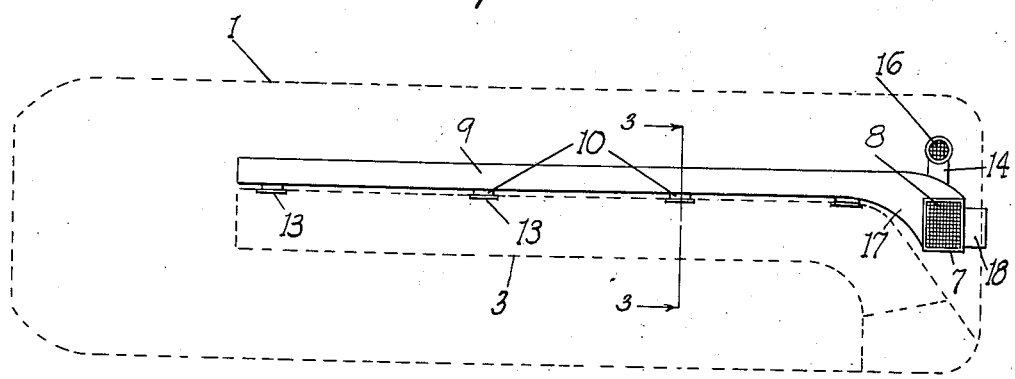
Fig. 2 is a plan view more clearly illustrating the arrangement of my system relative to the coach body, which is shown in dotted lines.
Figure 3:
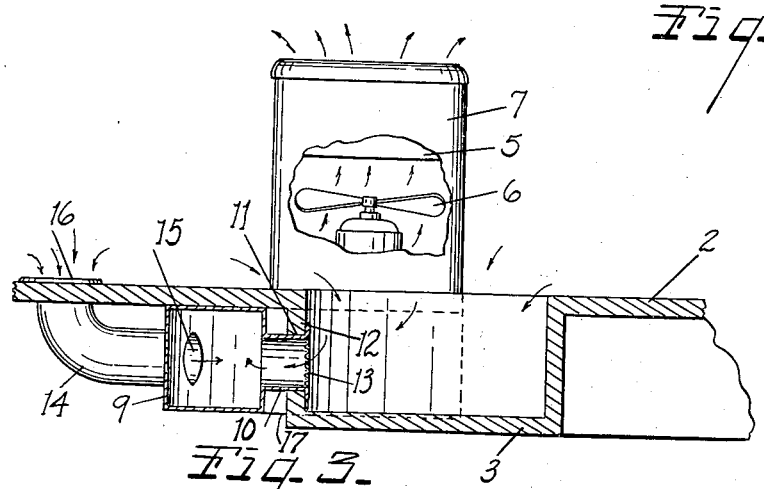
Fig. 3 is an enlarged fragmentary view partially broken away and in section transversely of the coach body, more particularly illustrating the arrangement of the parts.

If desired, an auxiliary return duct 14 may be provided adjacent the position normally occupied by the driver's seat to insure a circulation of heated air at this location, which is so often neglected in coach heating systems. This auxiliary or supplemental duct 14 opens to the main return duct 9 at 15 (see Fig. 3) and extends through the floor 2, as illustrated in Figs. 2 and 3, being covered at the latter point with a suitable screen or grille 16.

In operation, air is blown through the heating unit, whence it circulates upwardly and rearwardly throughout the interior of the coach, then downwardly through the intake ducts 10 at spaced points along the aisle to the return duct, then forwardly of the length of the coach to the heater 4 which it enters adjacent the bottom thereof beneath fan 6, as indicated at 17. The air is then reheated and recirculated. There is a similar circulation from the heater through auxiliary duct 14 to the return duct 9.

The foregoing system secures a uniform distribution of heated air throughout the coach and assures that the circulation will be uninterrupted regardless of drafts existing along the floor of the coach. The parts are extremely simple and inexpensive to make and install and in installed position they occupy a minimum of space within the coach and do not detract from the passenger's foot room as do other types of heaters heretofore employed. Further, the heated air is very uniformly distributed and pronounced drafts are avoided.

In the event that it is desired to provide a system wherein the air is renewed by taking outside air into the heater unit rather than recirculating the air, it will be apparent that the ducts 10 may exhaust to the outside of the coach with the heater 4 continually receiving a free supply of air through any suitable means. In such case, the disposition of the ducts in communication with the depressed aisle still has practical value in providing an efficient circulating system which is very economical of space. For this purpose and to renew the air occasionally in any event, I provide a front air intake box 18 provided with regulable shutters 19 of well known type, hence not more particularly illustrated and described, which can be adjusted as the operator sees fit to govern the admission or exclusion of fresh air relative to the vehicle.

I desire to point out that for best results all other avenues of escape for the heated air should be closed when a system such as I have described is installed. If the coach has roof ventilators, they should be closed to accentuate the even distribution of heat in the coach interior made possible by my system.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a heating system for a coach having a central depressed aisle extending longitudinally thereof, air heating means disposed adjacent the front end of the coach and adapted to forcibly direct air heated thereby upwardly, and means for promoting a circulation of the heated air rearwardly from the heating means, thence downwardly to said aisle and forwardly to the heating means, comprising a return duct disposed beneath the floor of the coach at one side of the said aisle and closely adjacent a side wall thereof and having a plurality of branch intake ducts communicating therewith, said branch ducts opening to said depressed aisle through said side wall thereof, and a further duct opening through the floor of the coach adjacent the driver's seat and communicating with said return duct, said return duct feeding air to the heating means for reheating and recirculation.

2. In a heating system for a coach having a depressed aisle extending longitudinally thereof, air heating means disposed adjacent the front end of the coach and adapted to forcibly direct air heated thereby upwardly, and means for promoting a circulation of the heated air rearwardly from the heating means, thence downwardly to said aisle and forwardly to the heating means, comprising a return duct disposed beneath the floor of the coach at one side of the said aisle and closely adjacent a side wall thereof and having a plurality of branch intake ducts communicating therewith, said branch ducts opening to said depressed aisle through said side wall thereof, said return duct feeding air to the heating means for reheating and recirculation.

3. A heating system for a coach having a depressed aisle extending substantially of the length of the passenger compartment of the coach, means in the coach for heating air and circulating the same upwardly, means for promoting uniform dispersion of the heated air throughout the interior of the coach, comprising a duct adjacent the aisle and substantially coextensive in length therewith, said duct communicating with the heater to return air thereto for reheating and recirculation, and a plurality of intake passages extending through a side wall of said aisle and communicating with said duct, whereby to return air to said duct from said aisle at a plurality of points spaced along the length thereof, and means for selectively admitting fresh air from the exterior of the coach to said heater.

WALTER A. KYSOR.